United States Patent [19]

Doble et al.

[11] Patent Number: 4,826,605
[45] Date of Patent: May 2, 1989

[54] PROCESS FOR DEPLETED CHEMICAL MILLING SOLUTIONS

[75] Inventors: Florimel Doble, Spring Valley; Jose M. Gallego, National City; El Steidl, Lakeside; Cyrus Jaffari, Alpine, all of Calif.

[73] Assignee: Caspian International, Inc., San Diego, Calif.

[21] Appl. No.: 926,188

[22] Filed: Nov. 3, 1986

[51] Int. Cl.$^4$ .............................................. C02F 1/62
[52] U.S. Cl. .................... 210/721; 210/722; 210/724; 210/726; 210/760; 210/912; 210/913; 156/642
[58] Field of Search ............... 210/712, 721, 724, 726, 210/758, 760, 912, 722, 913; 423/34, 35, 37, 87, 56, 101, 104, 140, 144; 156/642, 664, 665; 204/DIG. 13

[56] References Cited

U.S. PATENT DOCUMENTS

| 3,539,468 | 11/1970 | Wright | 423/127 |
| 3,973,987 | 8/1976 | Hewitt et al. | 210/167 |
| 4,289,594 | 9/1981 | Alpaugh et al. | 210/748 |
| 4,372,805 | 2/1983 | Takahashi et al. | 156/665 |

FOREIGN PATENT DOCUMENTS 53-132495 4/1977 Japan .

OTHER PUBLICATIONS

"Environmental Pollution Control Alternatives: Economics of Wastewater Treatment Alternatives for the Electroplating Industry" EPA 625/5-79-016, Jun. 1979, pp. 8-10.
Graham, K. A. "Electroplating Engineering Handbook" 3rd ed., 1976, pp. 778-780.

Primary Examiner—Tom Wyse
Attorney, Agent, or Firm—Brown, Martin, Haller & Meador

[57] ABSTRACT

A process is disclosed for removing heavy metals, dissolved aluminum, sulfides and organic compounds from a caustic etch solution, thereby regenerating the etching power of the solution or facilitating its disposal into the environment. The process consists of forming a first filtrate from which heavy metals present in the solution have been removed, and a second filtrate obtained by precipitating and oxidizing residual chemicals remaining in the first filtrate. The latter is done over a selected pH and temperature range. The second filtrate is then either reclaimed back to the etching tank, or subjected to ozonization prior to disposing of it into the environment.

24 Claims, 2 Drawing Sheets

PROCESS FOR DEPLETED CHEMICAL MILLING SOLUTIONS

BACKGROUND OF THE INVENTION

Chemical milling is that process whereby metal or metal alloys are removed in a controlled process from a metal surface by selective chemical etching in either an acid or alkaline bath. It is especially useful for removing minute amounts of metal from sheet components, particularly those that are employed in the aerospace industry. While aluminum or its alloys are the primary compounds that are chemically milled, any acid or base soluble metal can be milled. Thus, in addition to aluminum alloys, beryllium, magnesium, titanium, copper, tantalum, uranium, and various steel and stainless steel alloys are also millable, as well as refractory metals, particularly alloys of molybdenum, tungsten, niobium (columbium) and zirconium.

The chemical reactions involved in milling aluminum or alloys of aluminum are as follows:

$$2Al + 2NaOH + 2H_2O \rightarrow 2NaAlO_2 + 3H_2$$

and $$NaAlO_2 + H_2O \rightleftharpoons Al(OH)_3 + NaOH$$

There are three important considerations in performing chemical milling generally, and particularly as applied to milling aluminum. The first is controlling the working conditions in order to obtain, among other things, a proper etch rate range and a smooth surface; second, identifying chemicals or techniques that will prolong the etching power, known by those skilled in the art as etch rate of the etch solution. The third, intertwined with the first two, is removal of byproducts produced in the process which retard or reduce the activity of the solution.

The production of $NaAlO_2$ during the etching process is primarily responsible for the loss of etching power. Under normal operating conditions $NaAlO_2$ builds up, and forms a rock-like hydrate on the walls of the etching tank. Presently there are several procedures for reducing the level of $NaAlO_2$ in the etching solution, particularly the addition of chelating agents that prevent the precipitation of $NaAlO_2$ as described in U.S. Pat. No. 3,557,000. Further, it is known (U.S. Pat. No. 4,417,949, Inventor Lindner) that the addition of $NaNO_3$ to the etch solution reduces the formation of $NaAlO_2$. Procedures for removing the $NaAlO_2$ as $Al(OH)_3$ have also been detailed (U.S. Pat. No. 4,372,805, Inventors Takahashi and Hamamura, U.S. Pat. No. 4,136,026, Inventors Meyer, Johnson, Wodehorse)

The second major concern of the chemical milling industry is the development of procedures for disposing of the solution when it has expired beyond the point of being useful. The main problem associated with disposing of depleted solutions is getting rid of the dissolved aluminum, sulfides and organic compounds present in the solution, as well as other chemicals. For the most part, suitable disposal of the chemical etch solutions remians an unsolved problem.

Indeed, the industry has not developed a satisfactory procedure for disposal of the etch solution, other than merely carting it off to a chemical dumpsite, or removing some of the dissolved aluminum. It has become very costly to dispose of these solutions because of the enormous volumes of solutions, and because of new government restrictions on the disposal of wastes.

SUMMARY OF THE INVENTION

The present invention describes a process for removing chemical by-products from caustic etch solutions thereby rejuvenating the solution as well as making it acceptable for disposal directly into the environment.

The process comprises filtering the etch solution at a particular temperature through a unique filter combination to remove most of the suspended insoluble metal compounds. The pH of the resulting solution is then lowered and its temperature is increased thereby causing precipitation of residual metals and oxidation of any sulfides. Subsequent filtration removes the precipitate, and yields a second filtrate which can be returned to the etching tank for reuse where it has a rejuvenating effect on the etching power of the solution.

If the solution is to be disposed of, it can be further adjusted to lower the levels of undesirable chemicals present. This is most efficiently achieved by lowering the pH still more, and by oxidizing the solution with ozone one or more times, thus eliminating sulfides primarily. The sulfide content in the solution is monitored in steps by a suitable sampling and analyzing device, and when the level of the sulfides is environmentally acceptable, the filtrate is passed directly into the environment via the sewer.

DETAILED DESCRIPTION OF THE INVENTION

During the chemical milling process undesirable metal compounds, particularly metal sulfides and aluminum hydroxide, are produced as by-products, and affect the etching power of the solution. Because metal sulfides are insoluble in a basic solution (the primary solution used to mill aluminum compounds), a considerable amount of metal sulfides can be removed if the solution is filtered. Additionally, because sulfides undergo oxidation according to the following equation:

$$S^= + SO_2 \xrightarrow{\text{oxidizing conditions}} SO_4^=$$

Thus in addition to removing sulfides by filtration, it is also possible to remove them by oxidation. However, it is important to note that this reaction must be conducted under controlled conditions in order to avoid violent reactions.

We have found that one method useful to oxidize sulfides is the addition of a suitable oxidizing acid, particularly nitric acid. The latter oxidizes sulfides according to the following equation:

$$5NO_3^- + S^= + 2H^+ \rightarrow 5NO_2^- + SO_4^= + H_2O$$

Also, we have found that the addition of nitric acid not only effects the oxidation of sulfides but that it is useful to precipitate metal compounds, particularly compounds of aluminum.

It will be appreciated at the outset that the primary purpose of the invention described herein is to provide a method for removing chemical by-products from caustic etch solutions, thereby rejuvenating the solution as well as permitting it to be disposed of directly into the environment. It will become apparent, however, that the invention should not be construed so narrowly. Some of the chemicals that are removed from the etch solution, particularly $Al(OH)_3$ and $NaNO_3$, have considerable economic value. For instance, it is apparent that $NaNO_3$ is generated by the addition of nitric acid to the milling solution according to the following reaction:

$$HNO_3 + NaOH \rightarrow NaNO_3 + H_2O$$

Since $Al(OH)_3$ and $NaNO_3$ are recoverable by the instant invention, it is anticipated that the process described herein will find applicability in general chemical recovery and reclaiming bussinesses, as well as in the chemical milling industry.

Figure 1:
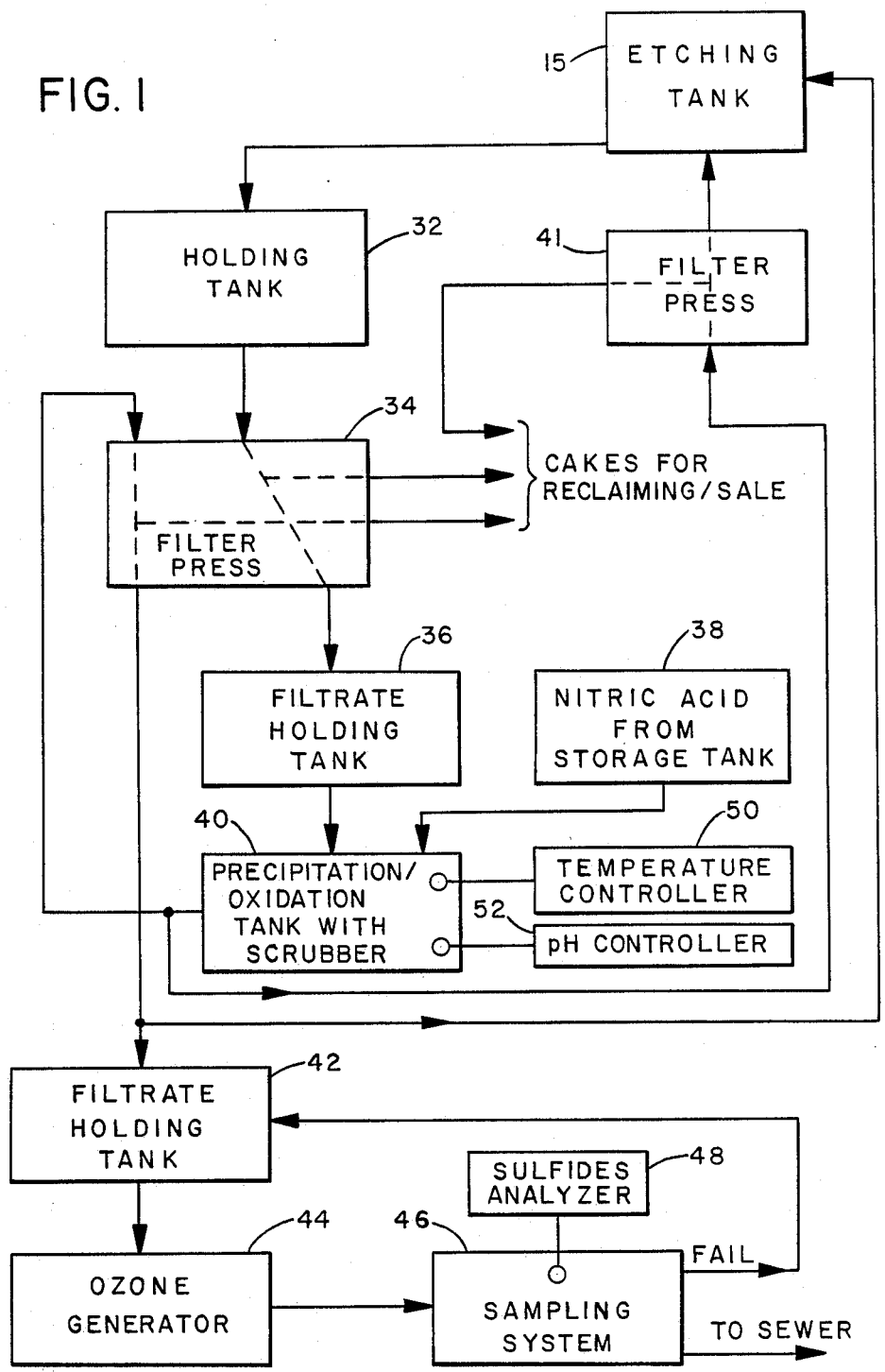
FIG. 1 shows in block diagram form a process for removing undesirable chemicals from a caustic etch solution thereby permitting its reuse in the etching process, or disposal into the environment.

FIG. 1 depicts in block diagram form the process of removing chemicals, particularly metals from a caustic etch solution. While the preferred embodiment of the present invention is the treatment of a chemical milling solution used to mill aluminum or aluminum alloys, particularly alloys with copper or zinc, or other metals, it is anticipated that the process can be suitably applied to chemical milling of other metals that are milled with caustic solutions.

Generally, an aluminum caustic milling solution will be processed when the solution contains an amount of milled aluminum that reduces its etching power. A variety of parameters are known to those skilled in the art to determine when the depleted solution should be processed. For example, a loss of etching power is indicated when the milled surface has poor etch lines, rough surfaces, waviness or other undesirable etching characteristics. A more precise indication, however, involves titrating the etch solution with an acid. This process can be most effectively achieved in two steps. The first consists of adding 1.0N sulfuric acid, such that about 8-20 ml of acid is required to lower the milling solution's pH to about 11. Then this is followed by an additional determination wherein approximately 15-39 mls of sulfuric acid are further needed to lower the pH to approximately 8.0. If the milling solution titrates in the ranges as described, then it is ready to be processed. The number of mls of sulfuric acid that are added in the two-step process for determining the etching power of the solution which are termed $N_1$, which indicates the amount of sodium hydroxide, and $N_2$, which indicates the amount of dissolved aluminum present in etching solution known to those skilled in the art.

The method described above would be favorably employed for a standard aluminum milling solution which generally comprises sodium hydroxide, sodium sulfide, chelating agents, and, optionally, anti-foaming agents well known to those skilled in the art. By way of illustration, the following approximate amounts of the various chemicals can be utilized in 100 gallons of etching solution: sodium hydroxide—24.2 gallons; triethanolamine—2 gallons; anti-foaming agent—0.7-1 cc; 5 lbs of sulphur; 3 lbs of start-up dissolved aluminum as $NaAlO_2$, and the remainder of the solution comprising water.

In addition to the above, it will, of course, be understood that the instant invention, with modifications known to those skilled in the art, encompasses virtually all caustic milling solutions having the hydroxide ion as the caustic agent. Thus, solutions shown in U.S. Pat. No. 4,588,474 having nitrate as a component, as well as other solutions described or shown therein, can be processed by the technique of the present invention.

Referring now to FIG. 1, etching tank 15 is shown which contains the etch solution having a temperature ranging from 160-225 degrees Fahrenheit prior to processing. Before aluminum compounds can be readily removed from the solution, the temperature should be lowered to about ambient to 120 degrees Fahrenheit. We have found that this procedure is most efficiently and rapidly carried out by transferring the etch solution to holding tank 32 where the solution is agitated to effect cooling. In addition to cooling the etch solution, agitation prevents any settling of insoluble material, thereby facilitating the subsequent filtration step.

The etch solution is then passed from holding tank 32 through filter device 34 which removes insoluble compounds and yields a first filtrate. The insoluble compounds that are primarily removed as a filter cake at this stage are composed of copper, lead, bismuth, nickel, chromium, iron and zinc sulfides. This filter cake can be sold for reclamation thus reducing the overall investment or operating cost of the process.

The filter device 34 is produced commercially from JWI Corporation, the manufacturer, and works most effectively with an acid resistant Kynar filter frame and cloth, coated with siliceous material. We have found that a particularly useful material is diatomaceous earth. At temperatures below 120° F., diatomaceous earth is sufficiently stable and interacts with the filter cloth, allowing the mill solutions to ensure a satisfactory flow rate and produce a solid filter cake.

While temperatures less than 120° F. are preferred when diatomaceous earth is employed, it is to be anticipated that temperatures greater may be suitable for other siliceous materials. The important consideration regarding the choice of filter coating material and temperature, is that the temperature should not cause the coating material to clog the filter. Such materials and temperatures are empirically determinable without undue experimentation by those skilled in the art.

In order to amass a defined amount of first filtrate for subsequent reactions, the first filtrate is passed into holding tank 36. When the desired amount of filtrate is reached, it is transferred to precipitation/oxidation tank 40. The pH of the solution in tank 40 is then lowered gradually with continuous agitation to 6-11. It is preferred that the pH be 9-11 if the filtrate will be reclaimed back to the etch tank, and the solution be maintained at a temperature of approximately ambient up to 200° F., the preferred temperature range being ambient to 180° F.

At this point in the processing it is desirable to dispose of the etching solution rather than reclaim it back to the etch tank. Additional undesirable chemicals can be removed from the filtrate by lowering the pH to 6-10, which effectively increases the oxidation power of the solution. The process is further enhanced if the temperature of the solution is kept in the range of about 120°-200° F. In addition to increasing the oxidation of undesirable chemicals, precipitation also continues under these conditions. However, pH's much lower than 6 should be avoided to prevent resolubilization of precipitated materials. For example, lowering the pH of the filtrate removes undesirable chemicals by causing them to both precipitate and oxidize. The latter event is enhanced by performing the process at elevated temperatures (up to 190° F.). Lastly, by agitating the resulting mixture in precipitation/oxidation tank 40, maximum reaction rates are achieved, as well as preventing sediment formation on the bottom of the tank.

As discussed above the parameters of pH and temperature control the precipitation and oxidization reactions and, by varying these parameters one of these events can be made to dominate the process. We have found that the most effective acid to perform both the precipitation and oxidation reactions discussed above is nitric acid.

Regardless of whether the first filtrate is being reclaimed and returned to the etching tank 15 or disposed of, the precipitation/oxidation tank 40 should be equipped with a suitable chemical scrubber to remove odorous or toxic fumes primarily composed of nitric oxides and sulfur dioxide that are released during the reaction of nitric acid with the filtrate.

After precipitation/oxidation with nitric acid, the filtrate can be passed through device 41 and returned to etching tank 15 for reuse in the milling process, or the filtrate can be passed through device 34 with [the aluminum hydroxide being removed as a cake for sale] and the filtrate being returned to etch tank 15 for reuse or held in filtrate holding tank 42 awaiting further processing. In either case, the solid aluminum hydroxide can be removed as a cake sale or reclaiming.

In the case where the filtrate is to be disposed to the environment, the filtrate coming from filter device 34 is reacted with ozone to remove any undesirable sulfides and organic compounds. This is done by cycling the solution through an ozone generator 44, then passing it through a sampling system 46. The sample removed is analyzed for sulfides with a sulfide analyzer to assess the level of sulfides that are present. The latter is the primary environmental restriction on disposing of the solution. If the level of sulfides has been reduced to an environmentally acceptable amount, the filtrate can be disposed of directly into the sewer system. If the sulfide level is higher than that which is acceptable, it is passed back to the holding tank 42 and again reacted with ozone. This process is repeated until the sulfide level has been reduced to an environmentally acceptable level. It should be noted that since the filtrate is rich in nitrates, the solution can be saved and sold, thus reducing the overall investment or operating cost.

It will be apparent to those skilled in the art that there are numerous materials and methods that can be suitably employed to effect the intended goals of the subject invention. Thus, the following examples are provided for illustrative purposes and should not be viewed as restrictive of the invention.

EXAMPLE I

Aluminum panels were added to a solution having a temperature in the range of 160-225 degrees Fahrenheit containing approximately 24 gallons of 50% NaOH, 2 gallons of triethanolamine, and about 0.7-1 cc of an anti-foaming agent per 100 gallons of water. The necessary requisite cleaning, masking, and other techniques needed to effect selective etching were employed, and are well known to those skilled in the art. After the etching reaction has been accomplished, and it is apparent that the etching power of the solution is reduced, the following test is conducted to confirm that the solution is ready for rejuvenation or disposal.

Approximately 5 mls of sample are removed from the etching solution and titrated with 1.0N sulphuric acid until a pH of about 11.3 is reached; this requires between about 8-16 mls of sulfuric acid. The same solution is further titrated with 1.0N sulfuric acid until a pH of about 8.2 is reached. If this requires about 22-39 mls of sulfuric acid, then the etching solution is ready to be processed.

A suitable amount of etch solution is passed to a holding tank where it is agitated by pumping air through the solution. This has a two-fold effect; first, it prevents settling of sludge at the bottom of the tank, and second, it reduces the temperature from about 160-225 degrees Fahrenheit to approximately ambient to 120 degrees Fahrenheit. The lower temperature permits the subsequent filtration step to be carried out without undue complications.

The etch solution is pumped to a filter device 34 having a heat and acid resistant Kynar filter. The filter is coated with diatomaceous earth which ensures continuous movement of the filtrate through the filter. Additionally, to aid filtration of the solution, the pump uses the following cycle: 25 psig for 0-30 minutes, 50 psig for 3 hours, 75 psig for 30 minutes, and 100 psig for 30 minutes to 4 hours. While the amount of diatomaceous earth that is effective can vary considerably, we have found that approximately 50 pounds per 16 cubic feet of filter works satisfactorily.

After the etch solution has passed through filter device 34 it is accumulated in a holding tank. The insoluble metals or metal alloys that have accumulated on the filter are disposed of, or sold to reclaiming companies. After about 2,000-2,500 gallons of filtrate have accumulated in the holding tank, it is pumped to the precipitation/oxidation tank 40. The pH of the filtrate is lowered to about 6-8 with nitric acid from nitric acid storage tank 38. Generally this requires a total amount of nitric acid equal to about 40-48 percent of the volume of the filtrate.

The nitric acid is added at a flow rate of approximately 1-15 gallons per minute, with constant agitation of the solution using a pumping apparatus that recirculates approximately 150 gallons per minute of solution. The temperature of precipitation/oxidation tank is kept approximately in the range of about 140-200 degrees Fahrenheit with a temperature controller 50. At this temperature, nitric acid effects considerable oxidation of undesirable chemicals in the etch solution. Additionally, the low pH causes compounds remaining in the solution to precipitate, particularly aluminum hydroxide.

Figure 2:
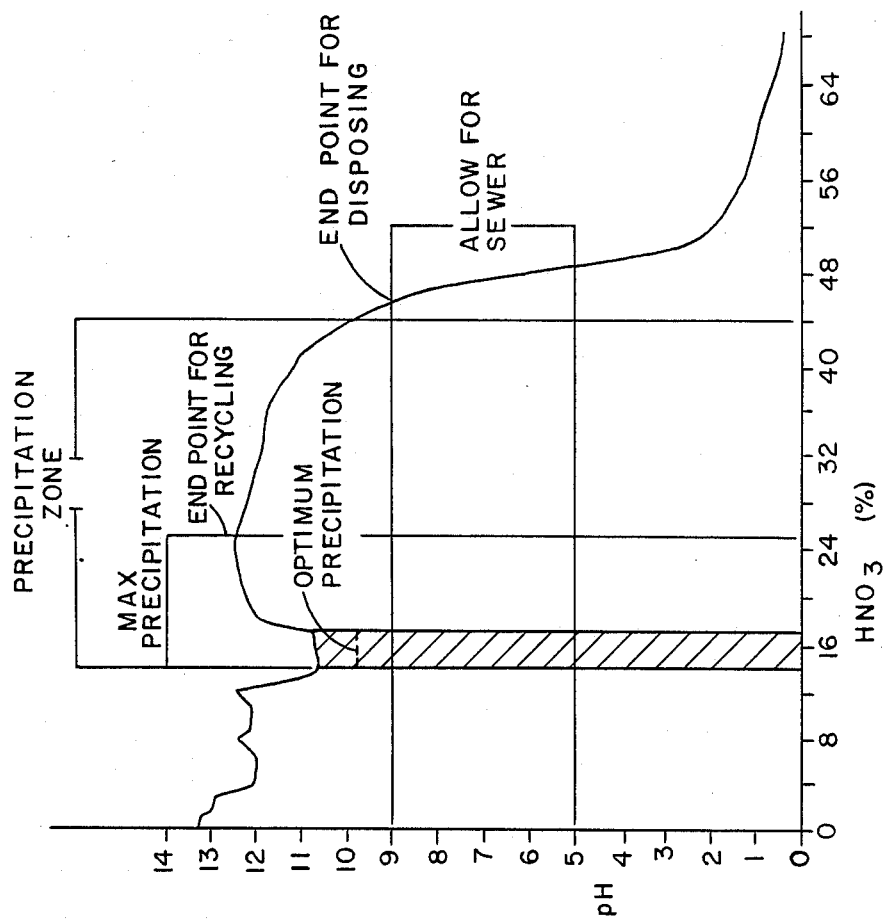
FIG. 2 shows the precipitation of metal compounds as a function of lowering the pH of the first filtrate with nitric acid.

FIG. 2 shows that maximum precipitation occurs when an amount of nitric acid equal to 13-17 percent of the solution is added. The pH is controlled with a pH controller 52. Lastly, the precipitation/oxidation tank is equipped with a chemical scrubber well-known to those in the art to trap fumes resulting from the oxidation reactions, particularly nitric oxides and sulfur dioxide fumes.

After the oxidation reactions have ceased, the temperature in the precipitation/oxidation tank 40 gradually decreases. To further increase the rate of solution cooling, the tank is agitated to achieve a temperature of approximately ambient to 120 degrees Fahrenheit. Subsequently, the etch solution is passed from the precipitation/oxidation tank 40 through filter device 34 or 41, where the aluminum hydroxide precipitate is trapped on the filter. The latter can be sold or disposed of, and the filtrate is then passed to a holding tank.

It will be appreciated that the aluminum hydroxide resulting from nitric acid precipitation in the precipitation/oxidation tank can be reclaimed after filtration of the solution through filter devices 34 or 41. In the former instance the filter cloth in filter device 34 should be cleaned and/or changed from its initial use in which the insoluble sulfides present in the etch solution were initially trapped. This is particularly true if aluminum hydroxide is sought to be recovered, as it is in a pure form and therefore it is not advisable to mix it with the insoluble sulfides.

The filtrate resulting from passage through filter device 34 is allowed to accumulate in holding tank 42, and when all of the solution has been filtered, the filtrate is reached with ozone, in an ozone generator 44, to effect oxidation of sulfides and other undesirable chemicals present in the solution. The ozone-reacted filtrate is then analyzed for sulfide levels, and if the levels are greater than approximately one milligram per liter, or whatever is environmentally acceptable, the solution is passed back to the holding tank and reacted with ozone once again. When the sulfide level has dropped below one milligram per milliliter, or again, whatever is environmentally acceptable, the solution is passed directly to the sewer. Alternatively, since the solution is rich in sodium nitrate, a valuable fertilizer, the solution can be saved and stored for later sale.

EXAMPLE II

The materials and methods described in this Example are the same as those described in Example I, with the following exceptions. The pH of the solution in the precipitation/oxidation tank 40 was about 8–10. Additionally, the solution after being passed through the filter device 41 and the aluminum hydroxide reclaimed therefrom, is returned to the etching tank in lieu of being shunted to the filtrate holding tank for subsequent ozone reaction.

EXAMPLE III

The materials and methods described in this Example are the same as those described in either Example I or II, with the following exception. After the etch solution has been passed from etching tank 15, the etching tank 15 is cleansed to remove sludge. This step effectively increases the lifetime of the etching solution being returned to the tank by approximately one to two months.

Having provided what are considered to be preferred embodiments of the instant invention, it will be apparent to those skilled in the art that various changes and modifications can be made thereto without departing from the spirit and scope of the invention.

We claim:

1. A method of disposing of a chemical caustic etch solution by removing undesirable chemicals comprising reducing the levels of said chemicals by forming a first filtrate of said solution substantially free of said chemicals comprising filtering said chemicals free of said solution at a temperature of about ambient to 120° F.;
    oxidizing and precipitating residual chemicals present in said first filtrate by adjusting said first filtrate to a pH of about 6–10 with acid, said oxidation being exothermic and said first filtrate subsequently cooling;
    forming a second filtrate substantially free of said residual chemicals by filtering said first filtrate at about a temperature of ambient to 120° F. thereby removing said residual chemicals;
    reacting said second filtrate with ozone to further remove trace chemicals;
    analyzing said second filtrate to determine the level of chemicals remaining in said second filtrate; and
    reacting said second filtrate with ozone one or more times if said chemicals are above a predetermined level and discharging said second filtrate if said chemicals are below a predetermined level.

2. A method as described in claim 1 wherein 100 gallons of said caustic solution prior to etching initially comprises about 24.2 gallons sodium hydroxide, 2 gallons triethanolamine, 0.7–1 cc anti-foaming agent, 5 lbs of sulphur, 3 lbs of start-up dissolved aluminum as $NaAlO_2$, and the remainder of the solution comprised of water.

3. A method as described in claim 1 wherein filtering said chemicals comprises passing said solution through a filter coated with siliceous material.

4. A method as described in claim 3 wherein said siliceous is diatomaceous earth.

5. A method as described in claim 4 wherein said chemicals are metals selected from the group consisting of manganese, copper, lead, bismuth, nickel, chromium, iron and zinc.

6. A method as described in claim 5 wherein adjusting said first filtrate to a pH of about 6–10 with acid comprises using nitric acid.

7. A method as described in claim 6 wherein said residual chemicals removed from said second filtrate are aluminum compounds.

8. A method as described in claim 7 wherein reacting said second filtrate is for a time sufficient to reduce sulfide levels below about 1 milligram/per liter.

9. A process for rejuvenating a caustic chemical etch solution comprising reducing the levels of chemicals present in said solution by removing an amount of said solution and forming a first filtrate therefrom by filtering said amount removed to rid it of said chemicals at a temperature of about 70°–120° F.;
    adjusting said first filtrate to a pH of about 8–10 with acid to oxidize and precipitate residual chemicals present in said first filtrate under exothermic conditions; and
    forming a second filtrate substantially free of said residual chemicals by filtering said first filtrate at a temperature of about 70°–120° F. and combining said second filtrate with said solution.

10. A process as described in claim 9 wherein 100 gallons of etching solution prior to etching initially comprises about 24.2 gallons sodium hydroxide, 2 gallons triethanolamine, 0.7–1 cc anti-foaming agent, 5 lbs of sulphur, 3 lbs of start up dissolved aluminum as $NaAlO_2$, and the remainder of the solution comprising of water.

11. A process as described in claim 10 wherein filtering said chemicals comprises passing said solution through a filter treated with siliceous material, thereby depositing said chemicals on said filter.

12. A process as described in claim 11 wherein said siliconaceous material is diatomaceous earth.

13. A process as described in claim 12 wherein said chemicals are metals or metal alloys selected from the group consisting of manganese, copper, lead, bismuth, nickel, chromium, iron and zinc.

14. A process as described in claim 13 wherein adjusting said first filtrate to a pH of about 6–10 with acid comprises using nitric acid.

15. A process as described in claim 14 wherein said residual chemicals removed from said second filtrate are aluminum compounds.

16. A method for disposing of a caustic solution for etching aluminum or aluminum alloys by removing undesirable chemicals present in said solution, comprising:
   determining when said etch solution has unsatisfactory etching power:
   forming a first filtrate of said solution substantially free of said undesirable chemicals by filtering said undesirable chemicals free of said solution at a temperature of about ambient to 120° F.;
   oxidizing and precipitating residual undesirable chemicals present in said first filtrate by adjusting said first filtrate to a pH of about 6–10 with nitric acid, said oxidation being exothermic and said first filtrate subsequently cooling;
   forming a second filtrate substantially free of said residual undesirable chemicals by filtering said first filtrate at about a temperature of about ambient to 120° F.;
   reacting said second filtrate with ozone to remove trace amounts of said undesirable chemicals;
   analyzing said second filtrate to determine the level of undesirable chemicals present therein; and
   additionally reacting said second filtrate with ozone one or more times if said undesirable chemicals are above a predetermined level, or discharging said second filtrate if said undesirable chemicals are below a predetermined level.

17. A method as described in claim 16 wherein determining when said etch solution has unsatisfactory etching power, comprises:
   performing a two-step titration of said solution wherein said first step comprises determining if the pH of a 5 milliliter aliquot of said solution can be lowered to about a pH of 11 with about 8–20 milliliters of 1.0 normal sulfuric acid; and said second step comprises further lowering the pH of said aliquot from about pH 11 to about 8 with a further addition of one normal sulfuric acid in an amount of about 15–39 milliliters.

18. A method as described in claim 17 wherein filtering said chemicals comprises passing said solution through a filter made of diatomaceous earth.

19. A method as described in claim 18 wherein said chemicals are metals selected from a group consisting of magnesium, copper, lead, bismuth, nickel, chromium, iron and zinc.

20. A method as described in claim 19 wherein said residual chemicals removed from said second filtrate are aluminum or aluminum alloys.

21. A method as described in claim 20 wherein reacting said second filtrate with ozone is for a time sufficient to reduce sulfide levels to about 1 mg/per liter.

22. A process for rejuvenating a chemical etch solution by reducing the levels of undesirable chemicals present therein when said solution first titrates to a pH of about 11 with about 8–20 milliliters of nitric acid, and second titrates to a pH of about 8 with about 15–39 milliliters of nitric acid, comprising:
   removing an amount of said solution and forming a first filtrate therefrom by filtering said amount through a filter to rid it of said undesirable chemicals at a temperature of about ambient to 120° F.;
   adjusting said first filtrate to a pH of about 8–10 with nitric acid to oxidize and precipitate residual undesirable chemicals present in said first filtrate under exothermic conditions;
   forming a second filtrate substantially free of said residual undesirable chemicals by filtering said first filtrate at a temperature of about ambient to 120° F.; and
   combining said second filtrate with said solution.

23. A process as described in claim 22 wherein said chemicals are metals or metal alloys selected from the group consisting of manganese, copper, lead, bismuth, nickel, chromium, iron and zinc.

24. A method as described in claim 23 wherein said residual chemicals removed from said second filtrate are aluminum or aluminum alloys.

* * * * *

UNITED STATES PATENT AND TRADEMARK OFFICE
CERTIFICATE OF CORRECTION

PATENT NO. : 4,826,605
DATED : May 2, 1989
INVENTOR(S) : Doble et al.

It is certified that error appears in the above-identified patent and that said Letters Patent is hereby corrected as shown below:

Column 8, (Claim 4), line 24, after "siliceous"

insert --material--.

Signed and Sealed this

Seventeenth Day of April, 1990

*Attest:*

HARRY F. MANBECK, JR.

*Attesting Officer*      *Commissioner of Patents and Trademarks*